United States Patent [19]

Kwok et al.

[11] Patent Number: 5,365,604
[45] Date of Patent: Nov. 15, 1994

[54] ERROR CONCEALMENT APPARATUS FOR VIDEO SIGNAL PROCESSORS

[75] Inventors: Wilson Kwok, Plainsboro; Huifang Sun, Princeton, both of N.J.

[73] Assignee: RCA Thomson Licensing Corporation, Princeton, N.J.

[21] Appl. No.: 4,358

[22] Filed: Jan. 14, 1993

[51] Int. Cl.⁵ .................................. G06K 9/40
[52] U.S. Cl. .................... 382/54; 348/616; 348/617
[58] Field of Search .............. 382/54, 56; 358/138, 358/167, 166, 336, 314; 348/616, 617, 399

[56] References Cited

U.S. PATENT DOCUMENTS

| | | | |
|---|---|---|---|
| 4,741,046 | 4/1988 | Matsunawa | 382/51 |
| 4,807,033 | 2/1989 | Keesen et al. | 358/167 |
| 4,941,186 | 7/1990 | Massmann et al. | 358/166 |
| 5,142,537 | 8/1992 | Kutner et al. | 358/160 |
| 5,243,428 | 9/1993 | Challapali et al. | 358/167 |

Primary Examiner—Leo H. Boudreau
Assistant Examiner—Phuoc Tran
Attorney, Agent, or Firm—Joseph S. Tripoli; Eric P. Herrmann; Ronald H. Kurdyla

[57] ABSTRACT

Error concealment apparatus for correcting errors in signals representing video images includes means for detecting image gradients in an area surrounding a lost block of image data. Circuitry responsive to these image gradients generates a plurality of blocks of directionally interpolated pixel values. The pixel values in the respective blocks of directionally interpolated pixel values are sorted according to amplitude, and then pixel values from mutually exclusive positions in the respective blocks are selected to form a block of pixel values for error concealment.

10 Claims, 4 Drawing Sheets

|  | BRIGHT FOREGROUND | BACKGROUND | DARK FOREGROUND |
|---|---|---|---|
| BRIGHT FOREGROUND | MAX | MAX | AVG |
| BACKGROUND | MAX | AVG | MIN |
| DARK FOREGROUND | AVG | MIN | MIN |

ERROR CONCEALMENT APPARATUS FOR VIDEO SIGNAL PROCESSORS

This invention relates to error concealment apparatus for replacing damaged or lost two dimensional blocks of pixel values in reproduced images.

BACKGROUND OF THE INVENTION

In video signal transmission systems of the type which compress video data on a block basis as for example systems which utilize discrete cosine transforms, data loss and/or data damage frequently occurs on a block basis (e.g. a 16×16 array of pixels). These transmission systems normally do not support enough overhead to correct all errors, but rather depend on error concealment techniques to provide substitute data which closely approximates the lost data. Werner Keesen et. al. in U.S. Pat. No. 4,807,033 issued Feb. 21, 1989, disclose an error concealment system for replacing two dimensional blocks of image data. This system includes apparatus for detecting blocks of lost data and replacing the lost image data in the spatial domain with pixel values generated from surrounding pixels by interpolation. The surrounding pixels are examined to determine the existence of image edges (gradients) and thereafter interpolation is performed to generate a block of pixel values to replace the lost or damaged block of pixel values.

Directional interpolation, as used herein, is the process of generating pixel values by performing one dimensional interpolation along a particular direction. Refer to FIG. 1 where the respective blocks represent respective image areas forming the basis of block based compression. The dots within the respective blocks represent pixel values, in this instance representing white or black image points. The center block which is void of dots represents a damaged block for which substitute pixels are to be generated. If for example, pairs of pixels within the two rows of pixels circumscribing the central block are appropriately examined, existing image gradients may be determined as for example the diagonal white line. Then biased on the gradient information interpolation is performed in the direction of the strongest detected gradients. In the Figure, the pixels which fall on a given arrow are generated from pixels in the adjacent blocks and occurring along extensions of the respective arrows.

The Keesen et.al apparatus detects image gradient information and for single gradients performs one directional interpolation. If more than one strong gradient is detected, a directional interpolation is performed for each of the strong gradients and the arithmetic sum of the respective directionally interpolated blocks of pixels is utilized as the substitute block.

Summing the respective interpolated blocks of pixels gives respective pixel values equal weight and tends to blur image features. Consider a gray image containing a horizontal white line behind a vertical black line. Vertical interpolation will generate a block of gray pixels including the vertical black line. Horizontal interpolation will generate a block of gray pixels including the horizontal white line The arithmetic average of these interpolated blocks will be a block of gray pixels including a lighter than black vertical line and a darker than white horizontal line, with a gray area at the intersection of the lines.

SUMMARY OF THE INVENTION

The present invention is an improvement over the Keesen et.al error concealment apparatus and includes means for detecting image gradients and means responsive to these image gradients for generating blocks of directionally interpolated pixel values. The pixel values in the respective blocks of directionally interpolated pixel values are sorted according to amplitude, and then pixel values from mutually exclusive positions in the respective blocks are selected to form a block of pixel values for error concealment.

DETAILED DESCRIPTION

In order to perform block based error concealment it is necessary to be able to determine lost or damaged blocks of signal. To this end it is assumed that the transmitted signal to be processed in the exemplary embodiments is formatted in transport packets. Each packet includes a header, a payload, and error check bytes. The header includes sufficient information to identify the spatial locations, in the reproduced image, of the respective blocks of compressed video data carried in the payload. The error check bytes are of a form to allow error detection of substantially all potential errors and at least partial error correction. An example of this type of signal format may be found in U.S. Pat. No. 5,247,363.

Figure 2:
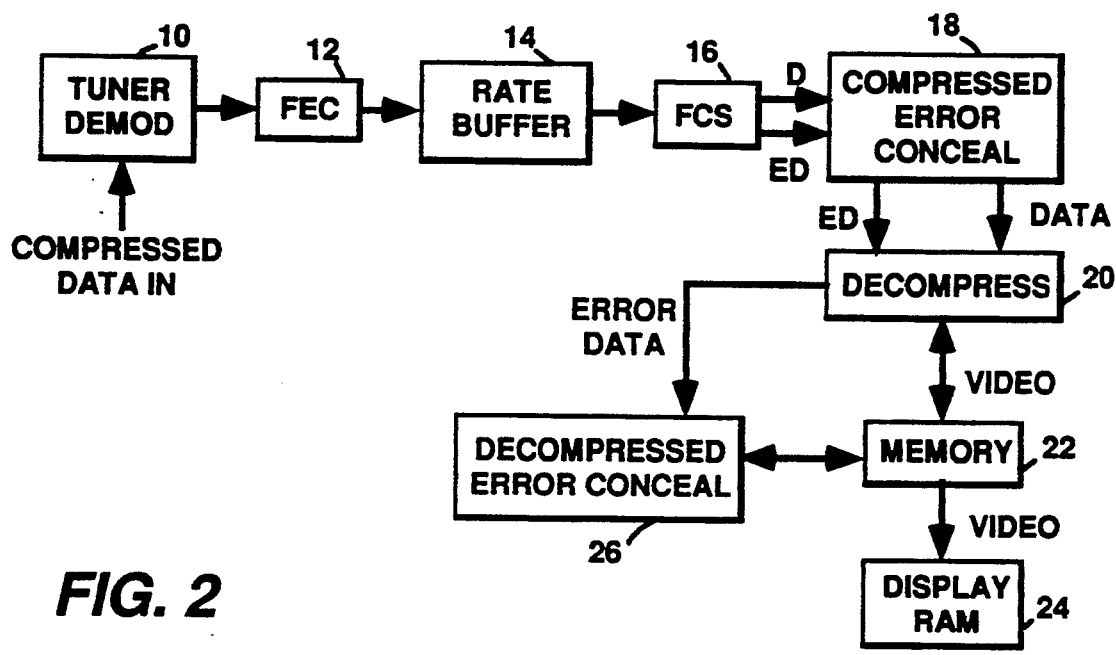
FIG. 2 is a block diagram of apparatus for decompressing video signal and including block based error concealment apparatus embodying the present invention.

Refer to FIG. 2 which illustrates a general form of a receiver for processing the above described signals. Transmitted signals, from for example, an antenna (not shown) are applied to a tuner/demodulator 10, which provides baseband signal. The baseband signal is applied to a forward error correction, FEC, decoder 12, which examines the transmitted signal and corrects errors incurred in the transmission channel, according to its error correction capability. Error corrected data from the FEC decoder 12 is applied to a rate buffer 14 which accepts data at a relatively constant rate from the FEC decoder 12 and outputs data on demand to the subsequent processing elements. Data from the buffer is coupled to a frame check sequence, FCS, decoder 16, which examines the error corrected data for uncorrected errors according to FCS check bits appended to the transport packets.

The FCS decoder 16 passes transport packets, D, to element 18 along with an error signal, ED, indicating whether respective transport packets contain data errors. Element 18, responsive to the error data, discards transport packets which include data errors. Error free transport packets are separated into video data and transport header data. The transport header data and error data, ED, are utilized to determine what data is lost, and thereafter to generate and substitute synthetic compressed video data for the lost data. An example of apparatus for creating synthetic compressed video data may be found in U.S. patent application Ser. No. 08/017,455, filed Feb. 12, 1993 which is a continuation of U.S. patent application Ser. No. 07/789,245, filed Nov. 7, 1991, and entitled "APPARATUS FOR CONCEALING ERRORS IN A DIGITAL VIDEO PROCESSING SYSTEM", now abandoned. Element 18 passes the combined error free video data and synthetic data to a decompressor 20. In addition element 18 passes error tokens to the decompressor 20, which tokens may provide several functions. For example, it may occur that for the type of data that was lost in a particular transport packet, a better image may be reproduced if decoding that portion of the data is simply skipped by the decompressor 20 rather than generating synthetic compressed video data for application to the decompressor. In this instance the error token is established to affect the sequence of operation of the decompressor. Alternatively, it may occur that it is known a priori, that synthetic compressed data for particular blocks is unlikely to produce acceptable images, and that altering the decoding sequence of the decompressor will not improve over utilizing synthetic compressed data. In this instance particular error tokens are passed to a further error concealment processor 26 which operates on decoded or decompressed video signal.

The decompressor 20 utilizes frames of memory 22 in the decompression process. This memory is arranged to store frames of decoded video signal for use in the process of motion compensated predictive decoding. Decoded image information is subsequently transferred to a display memory 24 from which it may be accessed in raster format for display.

The error concealment element 26 interacts with the decompressed data in memory 22, and substitutes image data identified by the error tokens. Luminance and chrominance data are decompressed separately but by similar processes and then recombined for display. The following discussion regarding error concealment is directed to concealment of errors in the luminance data. Errors in chrominance data are concealed in similar fashion by similar parallel apparatus not shown.

Figure 4:
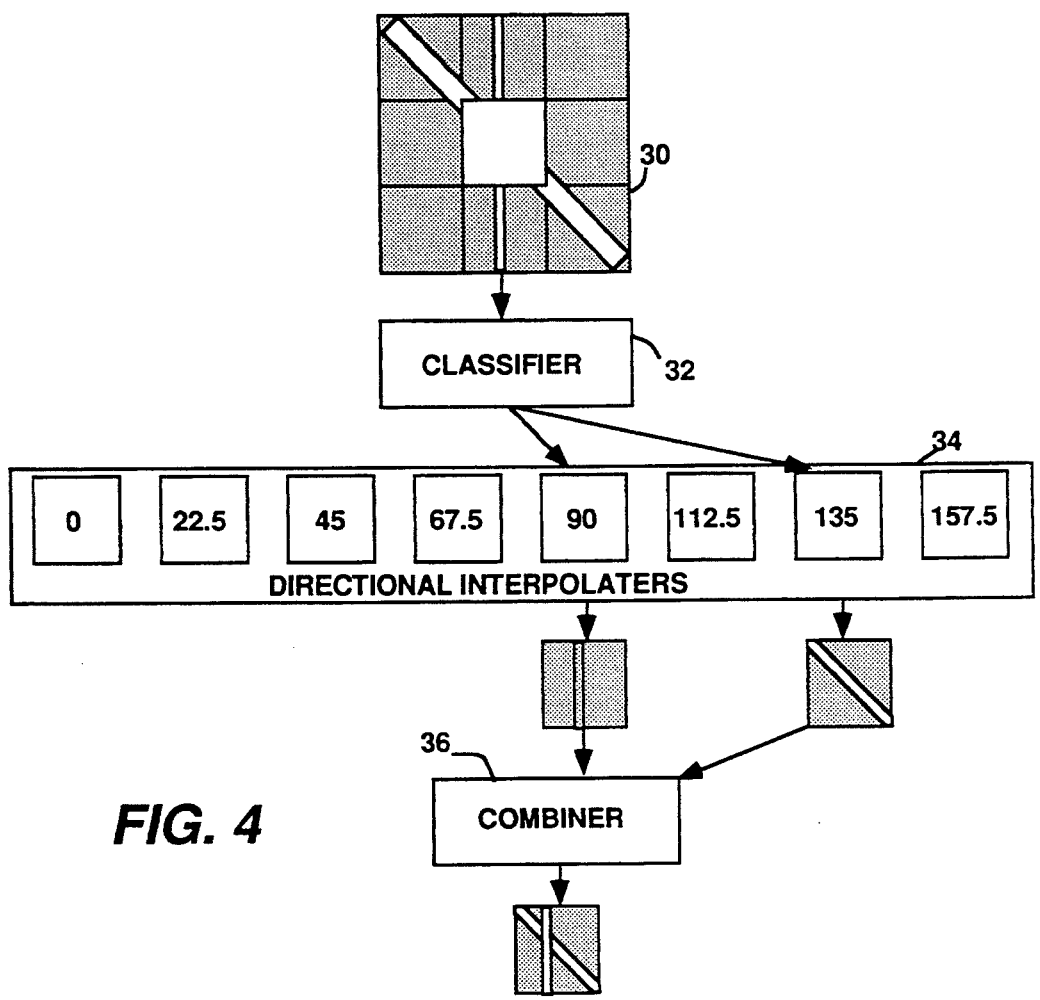
FIG. 4 is a pictorial representation of the concealment apparatus of FIG. 3.
Figure 3:
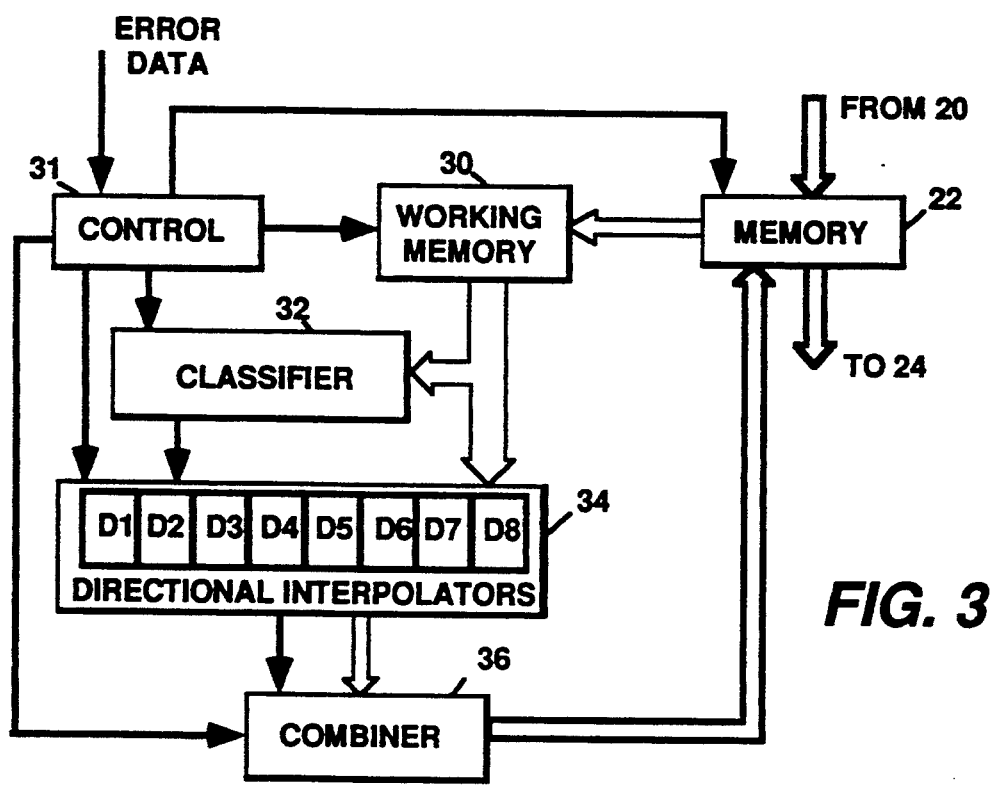
FIG. 3 is a block diagram of exemplary error concealment apparatus which may be employed for element 26 of FIG. 2.

FIG. 3 shows schematically and FIG. 4 shows pictorially the functions of one embodiment of the error concealment apparatus 26 of FIG. 2. Nominally these functions will be programmed into the software of a special purpose microprocessor though they may be provided by individual circuit elements as indicated. In FIG. 3 the ERROR DATA is provided to a controller 31 which, responsive thereto, marshalls the necessary pixel data through the respective circuit elements. In response to an indication of a lost block of pixel data the controller 31 accesses pixel values from the memory 22. The pixel data accessed are pixel values from blocks of pixels spatially adjacent to the lost or damaged block. For example three or four rows of pixels circumscribing the lost block may be accessed and provided to the working memory 30. The pixel data is then provided to a direction classifier 32. The direction classifier determines significant image gradients represented by the pixels surrounding the lost block, and then selects the top one, two or three gradient directions that tend to identify the predominant local image contours (or most strongly characterize image edge orientations).

Classification is performed through the use of gradient measures in the spatial domain. The local edge gradients $g_x$, and $g_y$ for a respective pixel location x(i,j), are computed from:

$$g_x + x_{i-1,j+1} - x_{i-1,j-1} + x_{i,j+1} - x_{i,j-1} + x_{i+1,j+1} - x_{i+1,j-1} \tag{1}$$

$$g_y + x_{i+1,j-1} - x_{i-1,j-1} + x_{i+1,j} - x_{i-1,j} + x_{i+1,j+1} - x_{i-1,j+1} \tag{2}$$

This is equivalent to applying the following 3×3 Prewitt convolutional mask operators:

$$g_x = \begin{bmatrix} -1 & 0 & 1 \\ -1 & 0 & 1 \\ -1 & 0 & 1 \end{bmatrix}$$

$$g_y = \begin{bmatrix} -1 & -1 & -1 \\ 0 & 0 & 0 \\ 1 & 1 & 1 \end{bmatrix}$$

The magnitude, G, and angular direction, Φ, of the gradient at (i,j) are given by:

$$G = \sqrt{g_x^2 + g_y^2} \tag{3}$$

$$\Phi = \tan^{-1}(g_y/g_x)$$

These gradient measures are computed for each (i,j) coordinate in the neighborhood surrounding the missing or damaged block. The value of the respective gradient angles are rounded to the nearest 22.5 degrees, for example, and thus corresponds to one of eight directional categories D1–D8. If a line drawn through a respective (i,j) neighborhood pixel coordinate with the direction determined by the gradient angle will pass through the missing block, that particular (ij) pixel coordinate is given a vote. The directional categories D1–D8 of the voting coordinates are mutually exclusively accumulated by summing the magnitudes of the associated directional gradients. That is, the magnitudes of the voting coordinates having directional category D1 are accumulated to form one sum, the magnitudes of the voting coordinates having directional category D2 are accumulated to form a second sum and so on. The directional categories exhibiting the largest accumulated sums determine pixel interpolation directions.

The selected directions provided by the classifier 32 are coupled to a directional interpolator 34. For each of the selected directions, the interpolator generates a block of spatially interpolated pixel values according to a corresponding directional interpolation algorithm. For a given direction, a series of one dimensional interpolations are performed using neighborhood pixel values intersected by a directional line cutting through the surrounding neighborhood. Depending upon the particular direction, not all pixel values may be generated by such a one dimensional procedure. In this instance the missing pixel values are generated by interpolation of the immediately surrounding interpolated pixel values. The respective interpolated blocks of pixel values are coupled to a combining circuit 36.

The combining circuit 36 is designed to extract the strongest characteristic features of the two or more images represented by the directionally interpolated blocks of pixel values. For each interpolated block, the mean value and the variance of the pixel values is calculated. Pixel values close to the mean may be considered to represent background image information and pixel values further from the mean to represent foreground information. It has been determined that a threshold of one standard deviation provides good results.

Figures 5, 6:
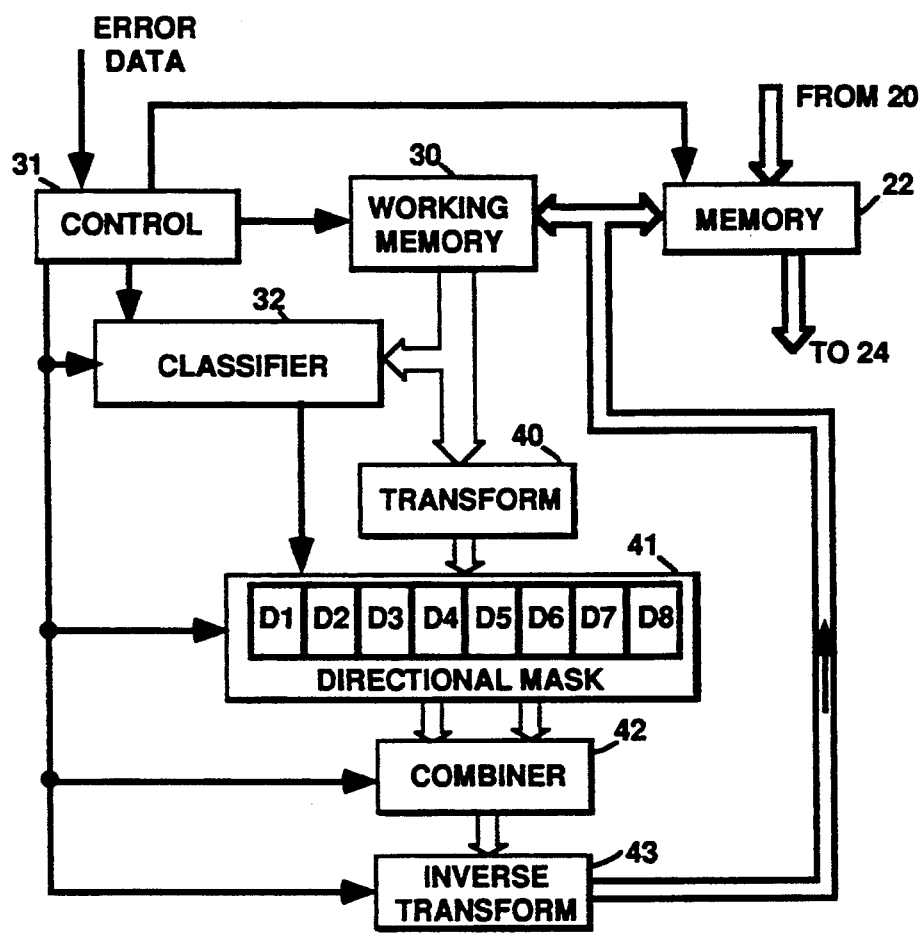
FIG. 5 is a Table showing an exemplary criterion of selecting pixels to form a substitute block of pixels when a plurality of directionally interpolated blocks of pixels are generated with respect to a single block location.
FIG. 6 is a block diagram of a second embodiment of a directional error concealment apparatus.

Pixel values that differ from the mean by more than one standard deviation and are greater or lesser than the mean correspond to bright foreground features, and dark foreground features respectively. To extract bright foreground features the maximum pixel values for respective coordinates from the different ones of the interpolated blocks are selected using a MAX operator. Similarly, to extract dark foreground features, a MIN operator is utilized to select the pixel values having the smallest values. The MAX (MIN) operator is simply the process of selecting the largest (smallest) pixel value from corresponding coordinates of the respective blocks designated as bright (dark) foreground pixels. The background features of the plurality of interpolated blocks of pixels are averaged. Pixel areas of one block may contain bright foreground features and corresponding areas of another block may contain dark foreground features. In these instances the pixels are also averaged. All foreground/background contention between pixels representing a corresponding coordinate are settled in favor of the value representing a foreground feature. FIG. 5 shows an exemplary matrix of pixel selection criteria for a system which combines pixels from two blocks of interpolated pixel values, and this matrix is easily expanded to encompass pixel value selection from three or more interpolated blocks.

Figure 7:
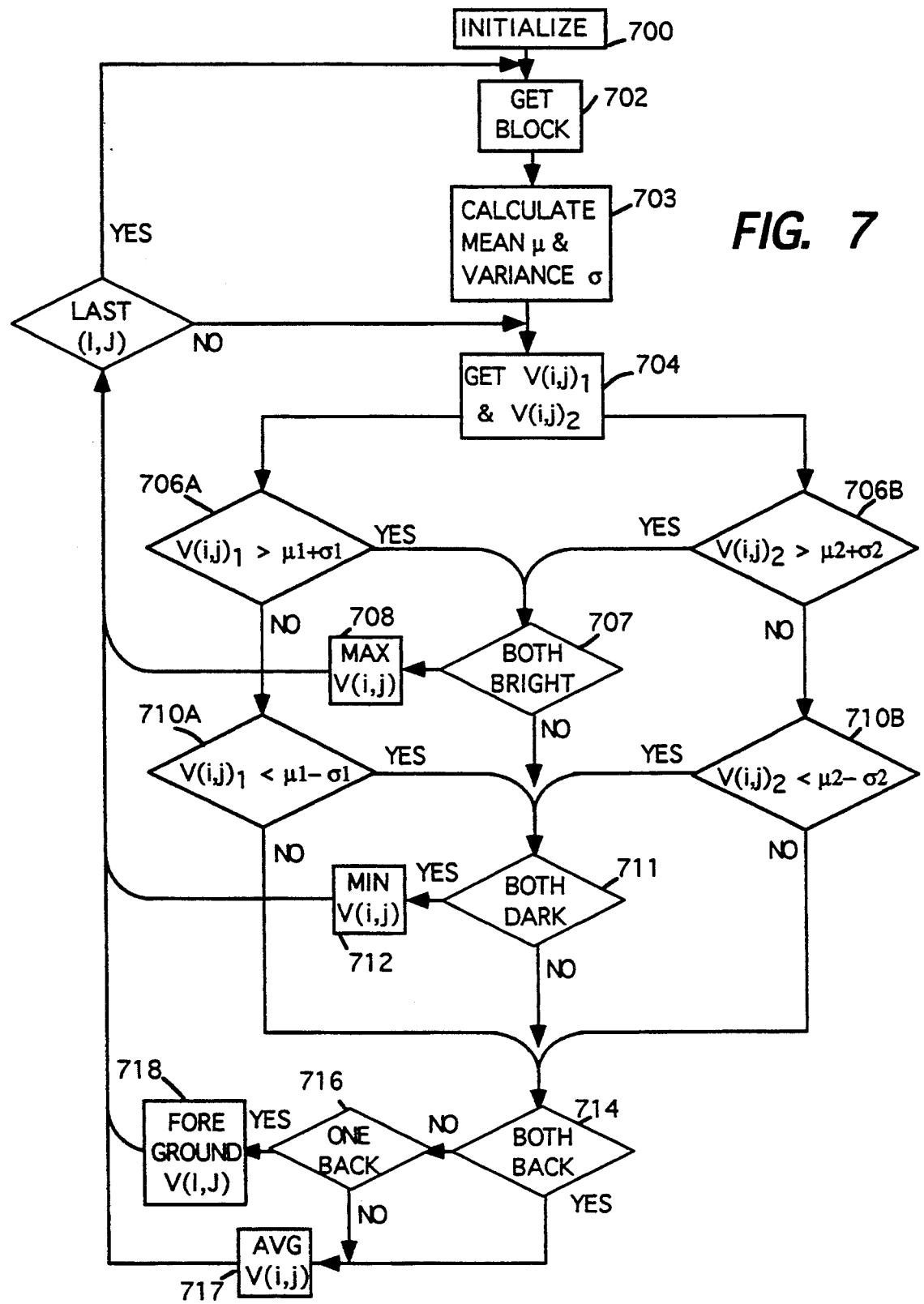
FIG. 7 is a flow chart showing the operation of the combining element 36 of FIG. 3.

FIG. 7 is a flow chart of the pixel value selection process of the combining circuit 36. This flow chart assumes that the system generates, at most, two interpolated blocks for each bad block. After the respective interpolated blocks of pixel values have been generated the circuit 36 is initialized [700]. The respective blocks are accessed [702] and the mean $\mu_i$ and the variance $\sigma_i$ of the pixel values V(i,j) are calculated [703] for the respective interpolated blocks. Pairs of pixel values $V(i,j)_i$ from corresponding coordinates of the two interpolated blocks are accessed [704], and the pixel values are compared to the sum of the respective mean and variance, $(\mu_i+\sigma_i)$, [706A, 706B]. If the respective pixel values are greater than their respective $(\mu_i+\sigma_i)$, they are considered to represent a bright foreground feature. Whether both pixels represent a bright foreground feature is checked [707], and if they do the maximum of the two pixel values is selected [708] as the pixel value for the respective coordinate of the substitute block. The system then accesses [704] and examines the next pair of pixel values. If they do not both represent bright foreground features, the pair of pixel values are examined [710A, 710B] to determine if they are respectively less than the difference of their respective means and variances, $(\mu_i-\sigma_i)$, and presumed to represent dark foreground image features. A check is made [711] to determine if they both represent dark foreground features, and if they do, the minimum of the two pixel values V(i,j) is selected to populate the corresponding coordinate of the substitute block of pixel values and the values for the next coordinate are accessed [704].

If a pixel values does not satisfy the conditions of step [706] and [710] that pixel is considered to represent a background image. If neither of the conditions of steps [707], [711] have been satisfied the corresponding pixel values are examined [714] to determine if they both represent a background image. If they do, the two pixel values are averaged [717] to provide a pixel value for the corresponding coordinate, and the system then accesses the next pair of pixel values. If they are not both background values, they are checked [716] to determined if one of them is a background pixel. If one is a background pixel, the other must be a foreground pixel and the foreground pixel is selected [718]. If one is not a background pixel then the two pixel values must represent a bright and a dark foreground feature. In this instance the two pixel values V(i,j) are averaged [717] to generate the pixel value for the corresponding coordinate.

One skilled in the art of system design will readily recognize that the system described in FIG. 7 is amenable to either a software realization in a microprocessor or a combinatorial logic hardware realization. A logic realization will provide significantly faster results.

Figure 1:
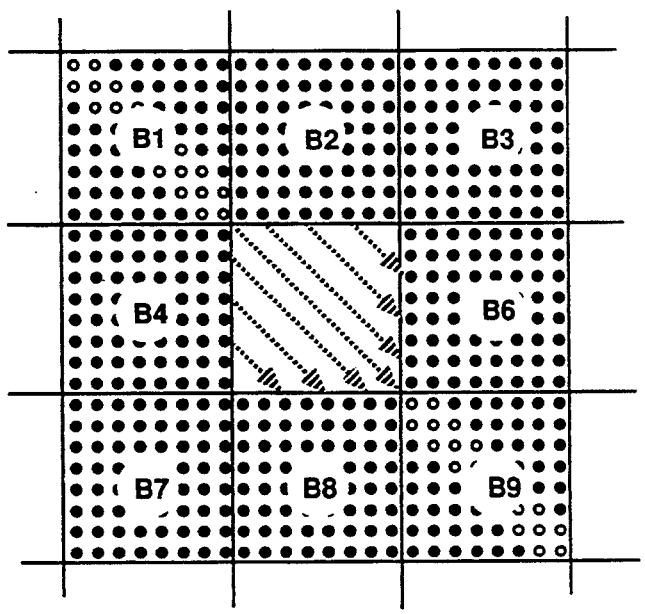
FIG. 1 is a pictorial representation of a portion of the blocks of pixel values representing an image, which representation is useful in describing the invention.

FIG. 6 illustrates a further embodiment of the invention. Elements of the FIG. 6 apparatus designated with the same numbers as elements of the FIGS. 2 and 3 apparatus are similar, and perform like functions. In this instance however, a greater portion of the neighboring pixels in the adjacent blocks may be utilized, and as many as all of the pixels in the blocks adjacent the lost block may be utilized. Assume that the center block shown in FIG. 1 is a missing block and substitute pixels are to be generated for this block. All of the pixels of the adjacent blocks B1-B4, B6-B9 are loaded into the working memory 30, and from this data, image gradient data D1-D8 are determined. A super block, the size of the nine blocks shown in FIG. 1, for example, and comprising the blocks of pixel data in memory 30 and nominal pixel values, for example values representing a midgray, for the pixel values of the missing block is assembled. This super block is applied to a transform element 40 which performs a spatial to frequency domain transform. The transform may take the form of a discrete cosine transform, or a fast fourier transform for example. The transform element 40 develops a matrix of coefficients including a DC coefficient representing the average of all of the pixel values in the composed superblock, and a plurality of AC coefficients representing the various frequency components of the spatial image. Respective ones of these coefficients represent the vertical, horizontal, and various diagonal frequency contents of the image, and these coefficients are easily identifiable. The transform coefficients are applied to a filter or directional mask 41. This filter is responsive to the gradient data provided by the classifier 32 to pass the transform coefficients which correspond to the angular frequencies represented by the spatial gradients and sets the remainder of the coefficients to zero value. The filter includes a plurality of mask operators each of which is arranged to provide a matrix of transform coefficients corresponding to data representing particular directional image data, with other coefficient positions in the matrix set to zero value. In other words the respective mask operators mask those coefficients which do not contribute spatial information corresponding to a selected spatial gradient angle. Selection of the mask operators D1–D8 is controlled by the classifier 32.

The directionally filtered matrices of transform coefficients are applied to a combining circuit 43, wherein the coefficients of the respective matrices are non additively combined to form a further matrix. Assume that the transform element 40 generates an N×N matrix of coefficients. Each of the directional matrices will also be an N×N matrix of coefficients, with coefficients at particular (i,j) matrix locations zeroed, and the remaining coefficients equal in value to the coefficients at corresponding locations in original matrix. More than one of the directional matrices applied to the combinet may have coefficients at corresponding matrix locations, which coefficients will have equal values. The combiner accesses the coefficients from the selected directional matrices, and populates the further matrix with the respective coefficient values found in all of the selected directional matrices.

The matrix of coefficients formed by the combiner 42 are applied to an inverse transform element 43 which transforms the frequency domain coefficient data to spatial domain data. The data provided by the inverse transform element 43 will consist of a super block of pixel data, which super block is the same size as the original or starting spatial super block. At this point, the pixel values generated by the inverse transform and corresponding to the missing block of pixels may be substituted for the missing block of pixel values in memory 22. Alternatively a more accurate estimate of the pixel values for the missing block may be obtained by iterating the preceding process. That is successive super blocks are formed and processed using data generated in the preceding iteration. In each iteration the missing block of the super block is populated with pixel values generated for the missing block in the previous iteration. Note that for successive iterations, the same gradient data is used for coefficient masking. It has been found that relatively good results are obtained with several iterations.

It was indicated above that the inverse transform element 43 generated a superblock of pixel values the same size as the original superblock. From transform data representing a particular size matrix of pixel values it is possible by inverse transform techniques to produce a lesser sized matrix of pixel values, and the inverse transform element 43 may be so arranged. That is from the coefficients representing the superblock, the inverse transform element 43 may be arranged to generate a block of pixel values the size of the missing block.

The size of the super block used in the preceding example was exemplary only. For missing blocks of e.g. 8×8 pixels, super blocks of 16×16 pixel values may be utilized, or super blocks of any convenient sizes.

What is claimed is:

1. Apparatus for concealing blocks of erroneous pixel data, each block consisting of a two dimensional matrix of pixel data, said apparatus comprising:

an addressable source of pixel data representing respective two dimensional images, said pixel data susceptible of including erroneous two dimensional blocks of such data:

a source of error data, said error data indicating which blocks of said pixel data are erroneous (hereinafter designated bad pixel data);

means responsive to said error data, for accessing from said addressable source of pixel data, pixel data located adjacent to a block of bad pixel data, and generating directional indicators Di which indicate respective angular directions, referenced to predetermined axes of said two dimensional images, of predominant image features represented by said pixel data located adjacent said block of bad pixel data;

means for generating from pixel data located adjacent to said block of bad data, and along directional lines corresponding to said indicators Di, respective synthesized blocks of pixel data for each indicator Di; and means for selectively combining pixel data from said respective synthesized blocks to form a further block of pixel data, and substituting said further block for said block of bad pixel data, said means for selectively combining populating respective matrix points of said further block with pixel data from corresponding matrix locations from said respective synthesized blocks, each matrix location of said further block being populated by pixel data selected exclusively from the corresponding matrix location of a single Synthesized block and pixel data populating said further matrix coming from at least two of said synthesized blocks.

2. The apparatus set forth in claim 1 wherein said means for generating along directional lines, respective synthesized blocks of pixel data includes means for performing one dimensional interpolations along an angular direction indicated by an indicator Di, using pixel data adjacent said block of bad pixel data.

3. The apparatus set forth in claim 2 wherein said means for selectively combining includes means for differentiating between interpolated pixel data representing foreground and background image features in each respective interpolated block of data, and wherein interpolated pixel data from corresponding matrix locations from said interpolated blocks are selected according to a predetermined hierarchy to populate a corresponding matrix location in said further block.

4. The apparatus set forth in claim 2 wherein said means for selectively combining includes means for differentiating between foreground and background pixel data; for differentiating between bright and dark foreground pixel data; and for selecting pixel data representing the brightest foreground feature from corresponding matrix locations of said interpolated blocks containing bright foreground pixel data to populate a corresponding matrix location of said further block.

5. The apparatus set forth in claim 4 wherein said means for selectively combining includes;

means for determining the mean value of pixel data for respective interpolated blocks, and selecting pixel data greater and lesser than said mean value by a predetermined amount to represent foreground features.

6. The apparatus set forth in claim 2 wherein said means for selectively combining includes means for differentiating between foreground and background pixel data and for differentiating between bright and dark foreground pixel data, and for selecting pixel data representing the foreground feature from corresponding matrix locations of said interpolated blocks containing foreground pixel data to populate a corresponding matrix location of said further block.

7. The apparatus set forth in claim 2 wherein said means for generating directional indicators Di, generates indicators restricted to a set of predetermined angular directions.

8. The apparatus set forth in claim 1 wherein said means responsive to said indicators Di for generating respective synthesized blocks of pixel data includes:

means for performing a spatial to frequency transform on a contiguous block of said pixel data, said contiguous block being larger than and including said bad block, to generate a matrix (block) of transform coefficients, wherein respective transform coefficients represent different directional image information;

means, responsive to said indicators Di, for forming respective intermediate matrices (blocks), each intermediate matrix formed by selection of ones of said transform coefficients which represent similar directionally oriented image information.

9. The apparatus set forth in claim 8 wherein said means for selectively combining, includes means for populating a matrix with coefficients contained in said intermediate matrices, and means for performing an inverse transform on the matrix of combined coefficients to generate a block of pixel values, ones of which correspond spatially to said block of bad pixel data.

10. Apparatus for concealing blocks of erroneous pixel data, each block consisting of a two dimensional matrix of pixel data, said apparatus comprising:

an addressable source of pixel data representing respective two dimensional images, said pixel data susceptible of including erroneous two dimensional blocks of such data:

a source of error data, said error data indicating which blocks of said pixel data are erroneous (hereinafter designated bad pixel data);

means responsive to said error data, for accessing from said addressable source of pixel data, pixel data located adjacent to a block of bad pixel data, and generating directional indicators Di which indicate respective angular directions, referenced to predetermined axes of said two dimensional images, of predominant image features represented by said pixel data located adjacent said block of bad pixel data;

means responsive to said indicators Di for providing interpolated blocks of pixel data, respective interpolated blocks of pixel data being generated by performing interpolations using pixel data selected along directional lines indicated by a corresponding indicator Di, from pixel data adjacent said block of bad pixel data;

means for differentiating between foreground and background pixel data and for differentiating between bright and dark foreground pixel data for each Of said interpolated blocks: and means for populating respective matrix locations of a further block representing said block of bad pixel data With pixel data from at least two of said interpolated blocks, by selecting, from said interpolated blocks, pixel data representing the brightest foreground feature from corresponding matrix locations containing bright foreground pixel data and pixel data representing the darkest foreground feature from corresponding matrix locations containing dark foreground pixel data.

* * * * *